Figure 1:
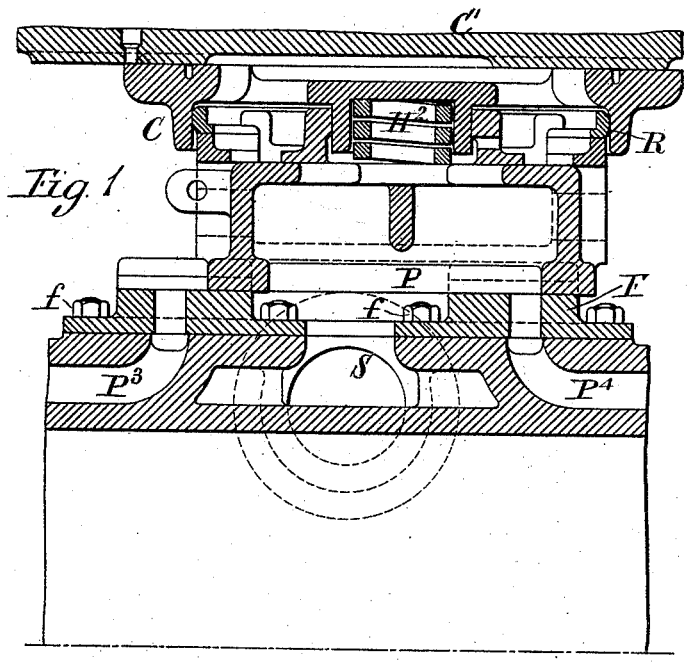

(No Model.) 12 Sheets—Sheet 1.

W. C. CHURCH.
SLIDE VALVE FOR STEAM ENGINES.

No. 476,130. Patented May 31, 1892.

Witnesses:—
J. A. Rutherford
J. H. Daly

Inventor:
Walter C. Church
By James L. Norris.
Attorney.

(No Model.) 12 Sheets—Sheet 2.

W. C. CHURCH.
SLIDE VALVE FOR STEAM ENGINES.

No. 476,130. Patented May 31, 1892.

Witnesses:— J. A. Rutherford. J. H. Daly.

Inventor: Walter C. Church. By James L. Norris, Attorney.

(No Model.) 12 Sheets—Sheet 3.
W. C. CHURCH.
SLIDE VALVE FOR STEAM ENGINES.
No. 476,130. Patented May 31, 1892.
Fig. 4.
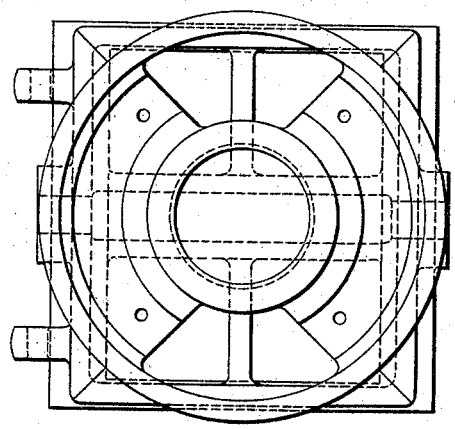
Fig. 10.
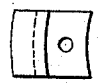
Fig. 5.
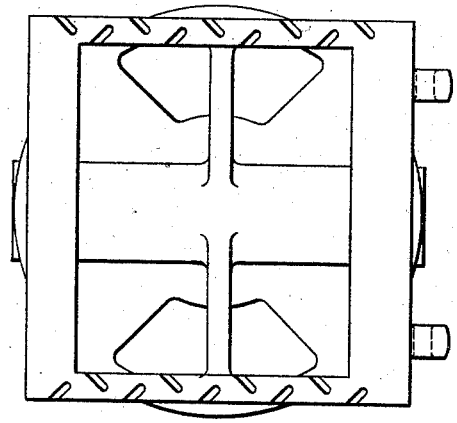
Witnesses:—
J. A. Rutherford
J. H. Daly
Inventor:
Walter C. Church
By James L. Norris
Attorney (No Model.) 12 Sheets—Sheet 4.
W. C. CHURCH.
SLIDE VALVE FOR STEAM ENGINES.

No. 476,130. Patented May 31, 1892.

(No Model.) 12 Sheets—Sheet 5.
W. C. CHURCH.
SLIDE VALVE FOR STEAM ENGINES.
No. 476,130. Patented May 31, 1892.
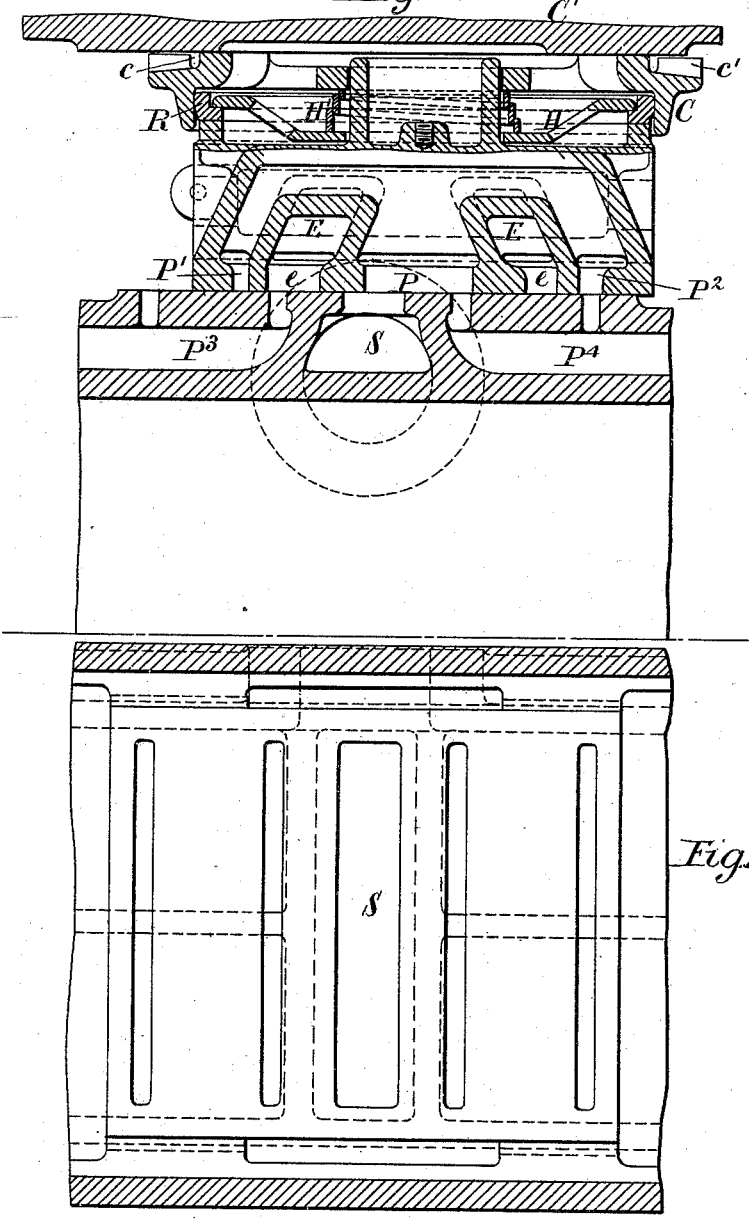

(No Model.) 12 Sheets—Sheet 6.

W. C. CHURCH.
SLIDE VALVE FOR STEAM ENGINES.

No. 476,130. Patented May 31, 1892.

Witnesses:—
J. A. Rutherford
J. H. Daly

Inventor:
Walter C. Church
By James L. Norris.
Attorney.

(No Model.)

W. C. CHURCH.
SLIDE VALVE FOR STEAM ENGINES.

No. 476,130.  Patented May 31, 1892.

(No Model.) 12 Sheets—Sheet 8.
W. C. CHURCH.
SLIDE VALVE FOR STEAM ENGINES.
No. 476,130. Patented May 31, 1892.
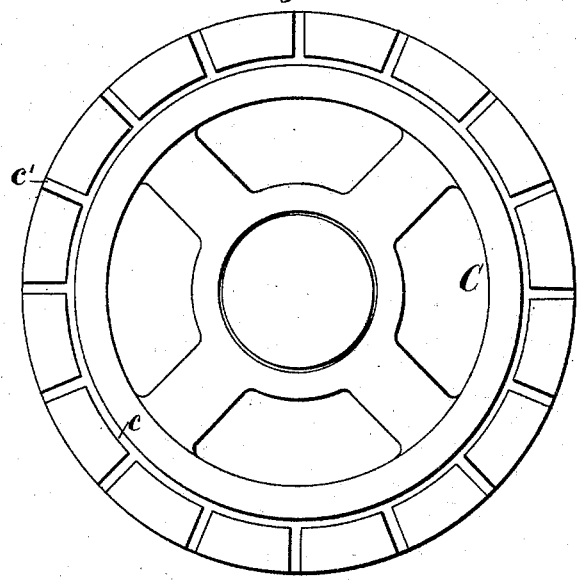
Fig. 17.
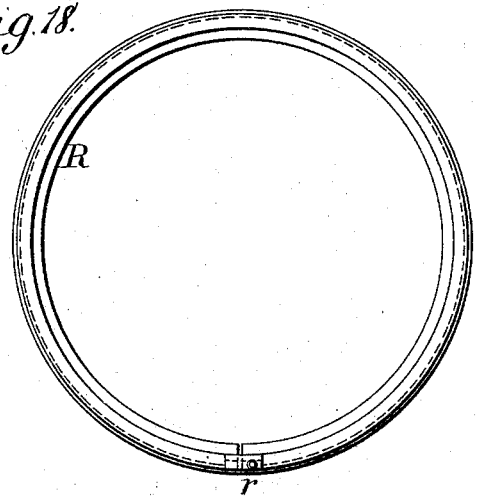 
Fig. 18. Fig. 19.
Witnesses:—
J. A. Rutherford
J. H. Daly
Inventor:
Walker C. Church
By James L. Norris.
Attorney (No Model.) 12 Sheets—Sheet 9.

W. C. CHURCH.
SLIDE VALVE FOR STEAM ENGINES.

No. 476,130. Patented May 31, 1892.

(No Model.) 12 Sheets—Sheet 10.
W. C. CHURCH.
SLIDE VALVE FOR STEAM ENGINES.

No. 476,130. Patented May 31, 1892.

Witnesses:
J. A. Rutherford
J. H. Daly

Inventor:
Walter C. Church
By James L. Norris
Attorney.

THE NORRIS PETERS CO., PHOTO-LITHO., WASHINGTON, D. C.

(No Model.) 12 Sheets—Sheet 11.

W. C. CHURCH.
SLIDE VALVE FOR STEAM ENGINES.

No. 476,130. Patented May 31, 1892.

Witnesses:—
J. A. Rutherford
J. H. Daly

Inventor:
Walter C. Church
By James L. Norris.
Attorney.

(No Model.) 12 Sheets—Sheet 12.
W. C. CHURCH.
SLIDE VALVE FOR STEAM ENGINES.
No. 476,130. Patented May 31, 1892.
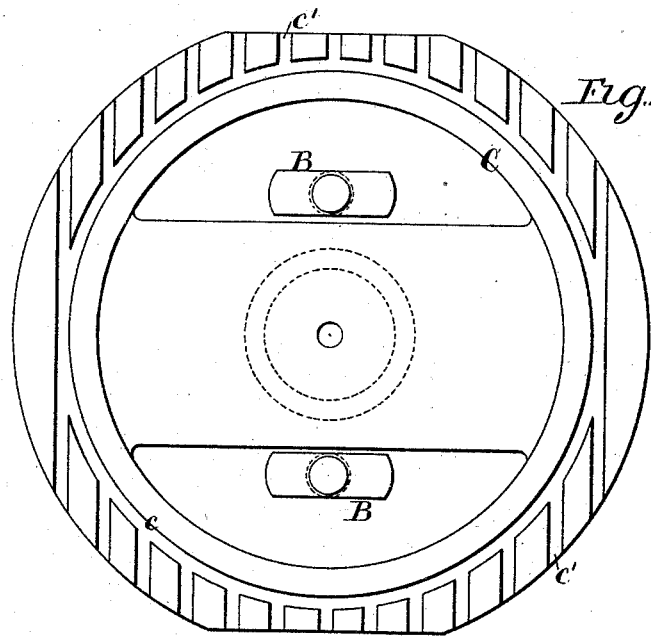
Fig. 26.
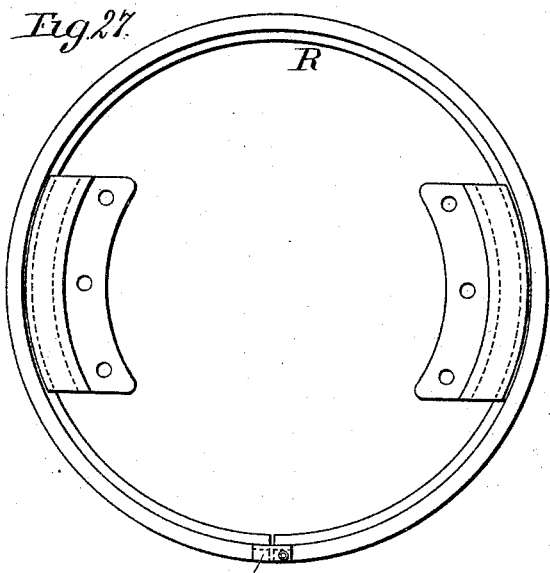 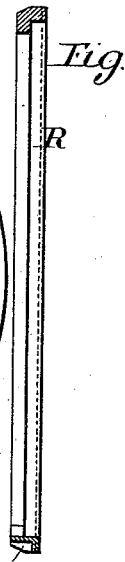
Fig. 27. Fig. 28.

UNITED STATES PATENT OFFICE.

WALTER C. CHURCH, OF BRIXTON, ENGLAND.

SLIDE-VALVE FOR STEAM-ENGINES.

SPECIFICATION forming part of Letters Patent No. 476,130, dated May 31, 1892.

Application filed May 2, 1891. Serial No. 391,388. (No model.) Patented in England May 8, 1890, No. 7,187; in France February 10, 1891, No. 211,314; in Belgium February 19, 1891, No. 93,820; in Italy May 19, 1891, LVIII, 97, and in Austria-Hungary October 6, 1891, No. 19,818 and No. 47,057.

*To all whom it may concern:*

Be it known that I, WALTER CHARLES CHURCH, a citizen of England, and a resident of 6 Trinity Square, Brixton, in the county of Surrey, England, have invented certain new and useful Improvements in Slide-Valves for Steam-Engines, (for which I have obtained patents in Great Britain, dated May 8, 1890, No. 7,187; in France, dated February 10, 1891, No. 211,314; in Belgium, dated February 19, 1891, No. 93,820; in Austria-Hungary, dated October 6, 1891, No. 19,818 and No. 47,057, and in Italy, dated May 19, 1891, LVIII, 97,) of which the following is a specification.

My invention relates to the construction and arrangement of slide-valves and their ports, passages, and packings for steam or other fluid-pressure engines. I admit the steam or other working fluid through the middle of the cylinder, facing into the interior of the slide-valve, and I discharge the exhaust into the slide-jacket outside the slide-valve. When the slide is double-ported, I provide within the body of the slide-valve exhaust-passages opening into the jacket and having ports alternating with the admission-ports from the interior of the slide. I fix the facing on which the slide works to the cylinder-face not as usual, by screws passing through the facing, but by studs and nuts securing flanges at the edges and middle of the facing. On the upper side of the slide-valve I fit a cap, which travels with it but can work a little to and fro on an internal spring-ring, and in order to allow for slight canting of the slide-valve relatively to the cover or plate against which the cap works I make the spring-ring and the recess of the cap in which it fits slightly oblique or rounded. I arrange the areas pressed upon by the supply and the discharge fluid so that the pressures toward the cover nearly balance those toward the face, providing a spring under the cap, which presses both it and the slide-valve toward the faces against which they work. In the working faces I form chases to allow escape of leakage-fluid, arranging these faces so that those of the slide and cap as they make their stroke overpass those in the stationary faces against which they work. For slide-valves of considerable size or when high pressure is employed I prefer to provide a central tie-bolt or a pair of these bolts, which pass through the slide-valve and secure the cover of the slide-jacket to the cylinder.

The accompanying drawings, Figures 1 to 10, inclusive, illustrate my improvements applied to a slide-valve governing single ports. Figs. 11 to 19, inclusive, and Figs. 20 to 28, inclusive, illustrate their application to a slide-valve governing double ports, Figs. 20 to 28 showing the cover of the slide-case supported against excessive strain by means of bolts tying it to the body of the cylinder.

In all the figures similar letters of reference are employed as far as possible to indicate corresponding parts.

Figure 3:
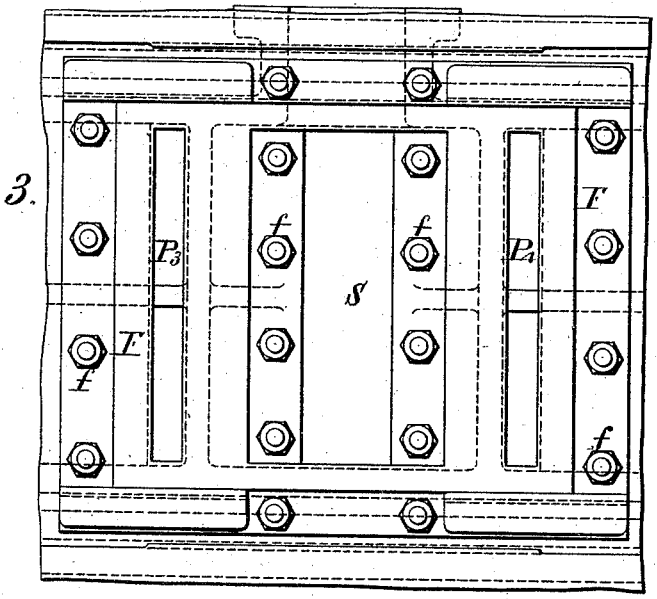
Figure 2:
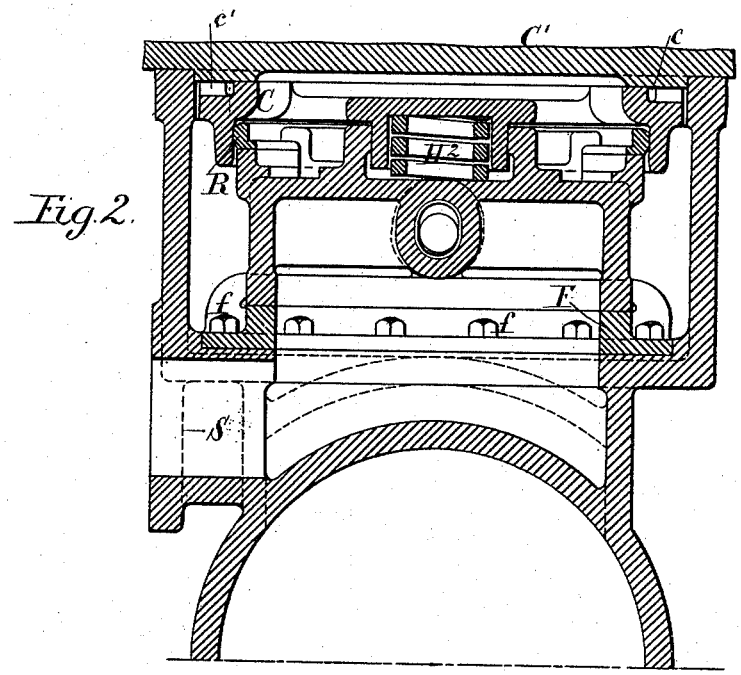
Figure 6:
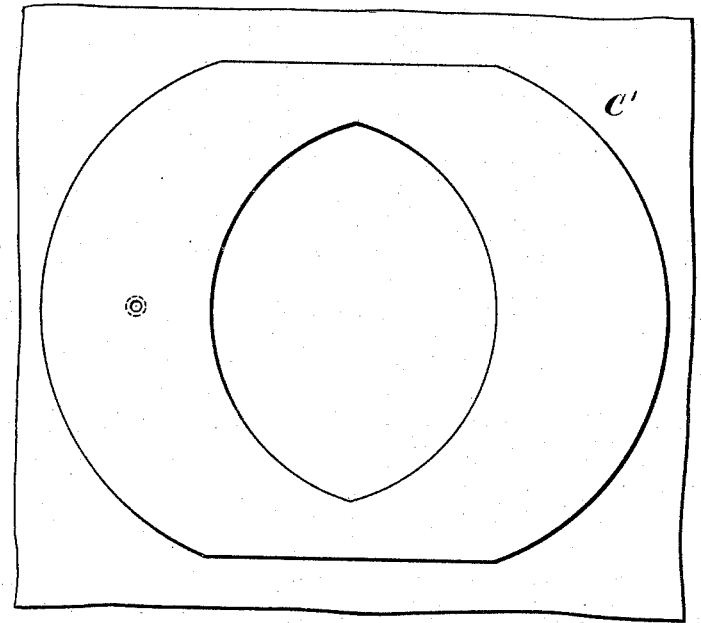
Figure 7:
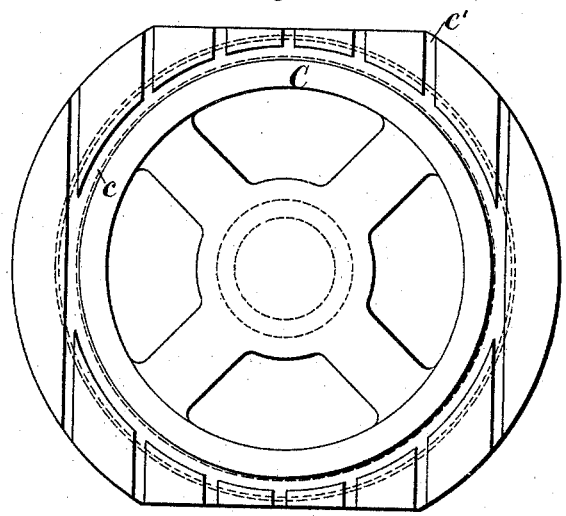
Figure 8:
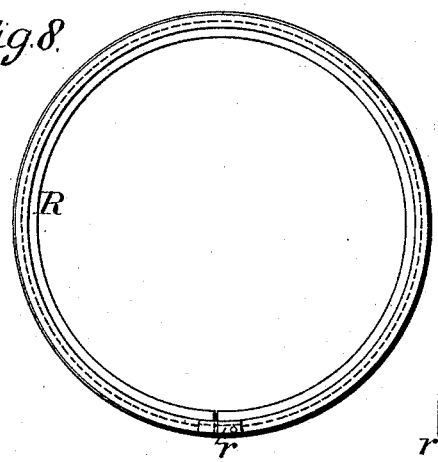
Figure 9:

Having reference to Figs. 1 to 10, which illustrate my improvements applied to a slide-valve governing single ports, Figs. 1 and 2 are longitudinal and transverse sections of the slide-valves and their cases. Fig. 3 is a plan of the cylinder-facing, on which the slide-valve works, showing the ports leading to the ends of the cylinder. Fig. 4 is a plan of the upper face of the slide just below the cap C, which works against the under facing of the cover of the slide-case. Fig. 5 is a plan, looking from below, of the under face of the slide-valve. Fig. 6 is a plan, looking from below, of the rubbing-faces formed on the under side of the cover of the slide-case. Fig. 7 is a plan of the cap C, which rubs against the lower face of the cover. Fig. 8 is a plan view, and Fig. 9 is a section, of the spring-ring R, which forms a packing for the cap C; and Fig. 10 is a detail.

Figure 12:
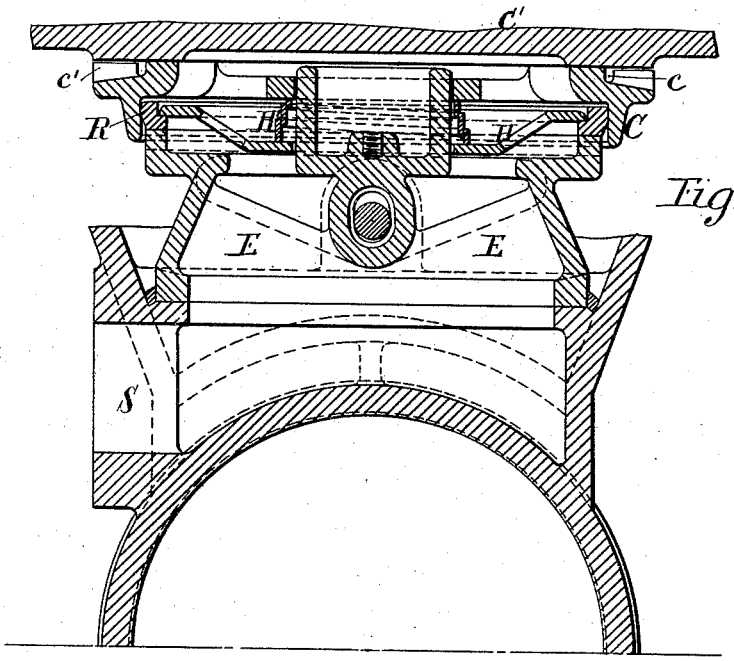
Figure 16:
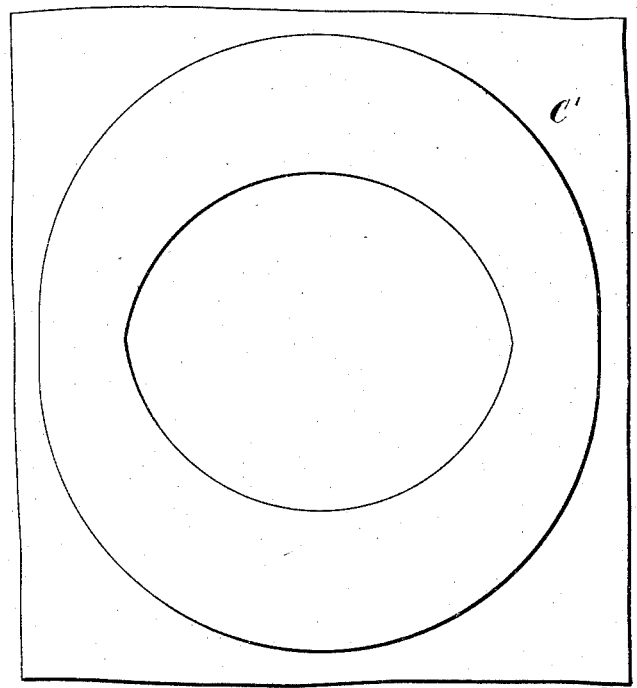
Figure 14:
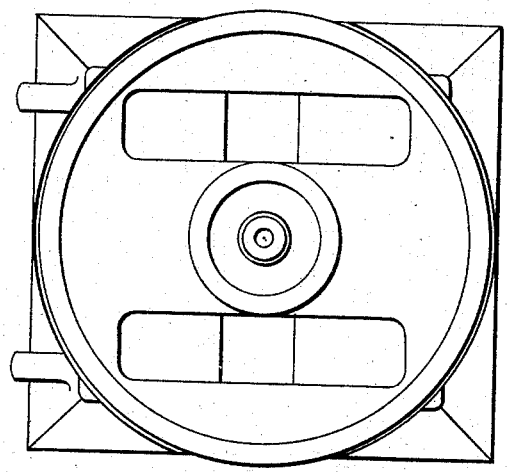
Figure 15:
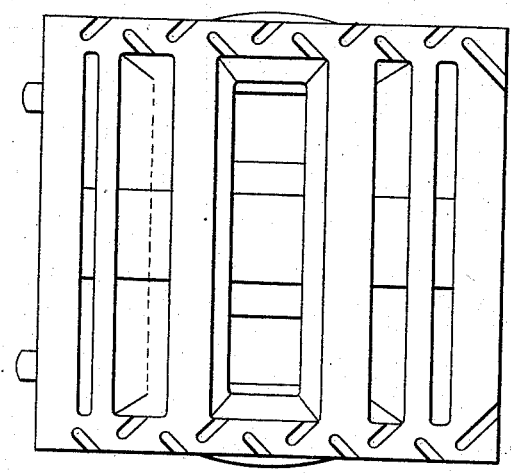

Having reference to Figs. 10 to 19, which illustrate my improvements applied to a slide-valve governing double ports, Figs. 11 and 12 are longitudinal and transverse sections of the slide-valves and their cases. Fig. 13 is a plan of the cylinder-facing, on which the slide-valve works, showing the ports leading to the ends of the cylinder. Fig. 14 is a plan of the upper face of the slide just below the cap C, which works against the under facing of the cover of the slide-case. Fig. 15 is a plan, looking from below, of the under face of the slide-valve. Fig. 16 is a plan, looking from below, of the rubbing-faces formed on the under side of the cover of the slide-case. Fig. 17 is a plan of the cap which rubs against the lower face of the cover. Fig. 18 is a plan, and Fig. 19 a section, of the spring-ring R, which forms a packing for the cap C.

Figure 20:
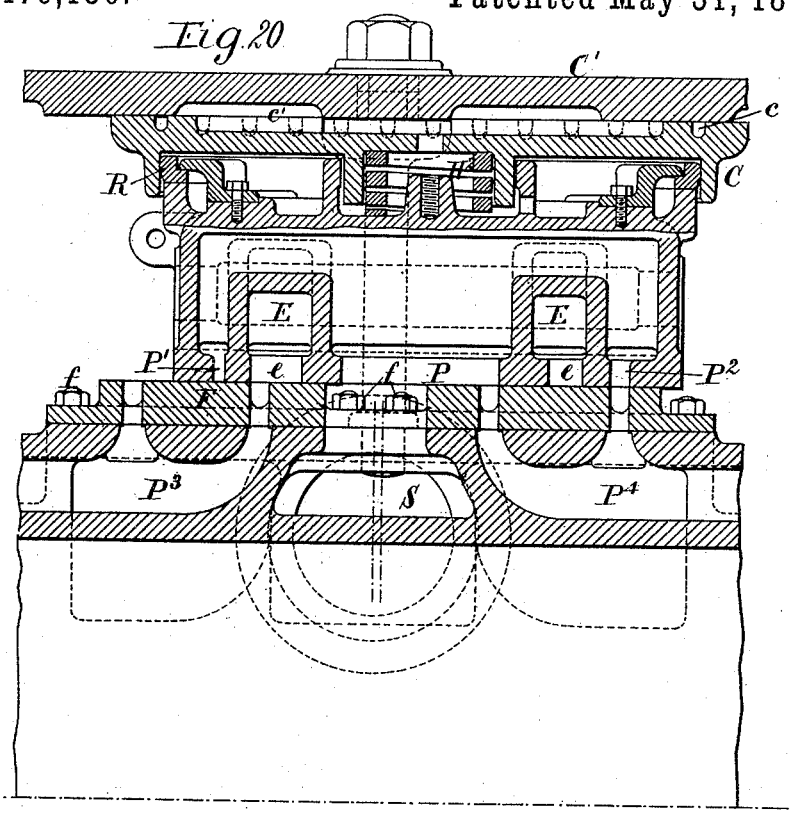
Figure 22:
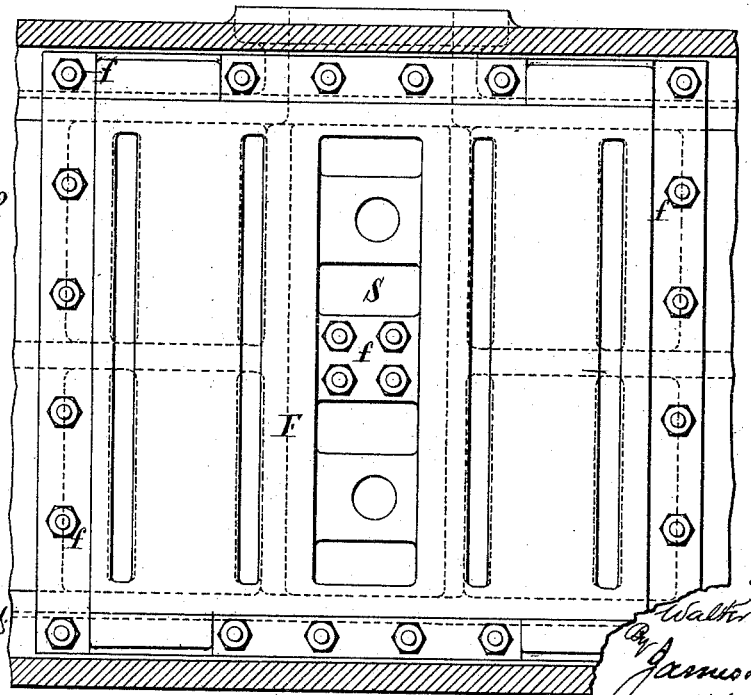
Figure 21:
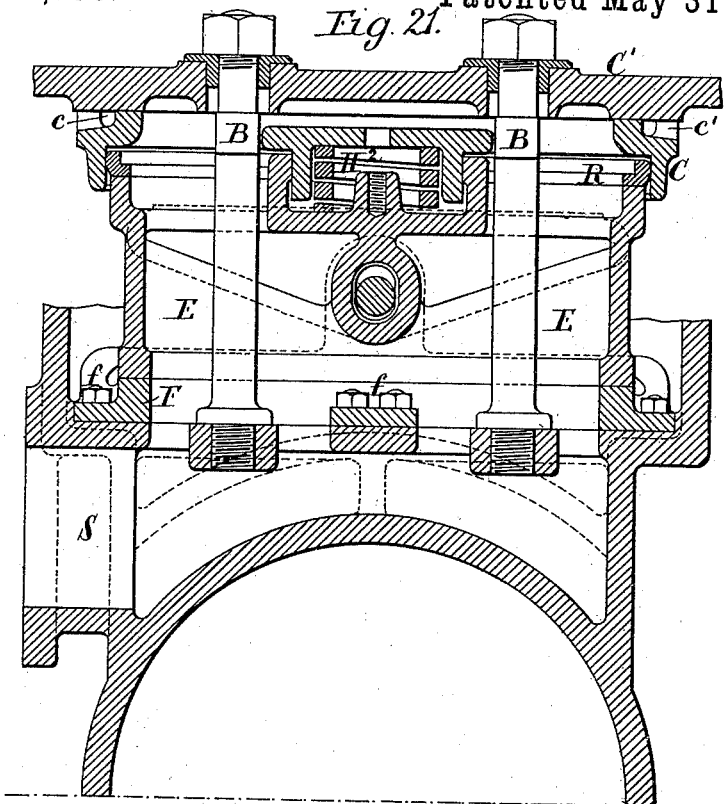
Figure 25:
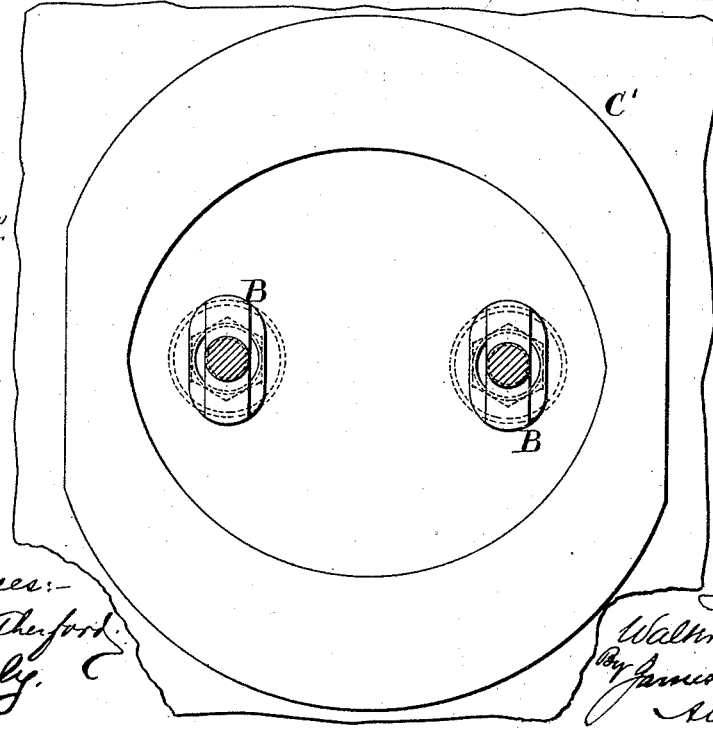
Figure 24:
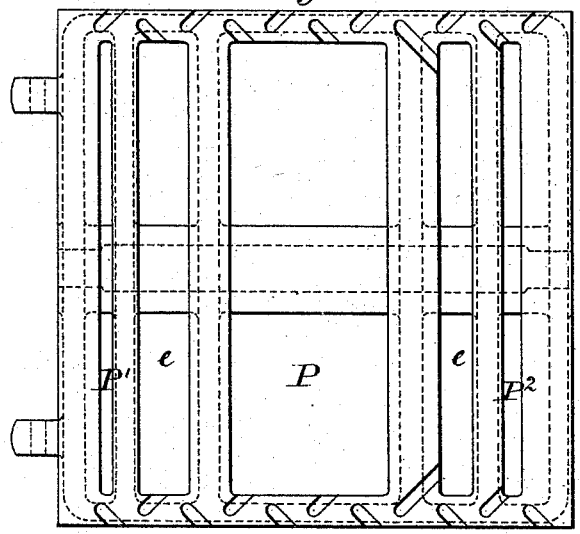
Figure 23:
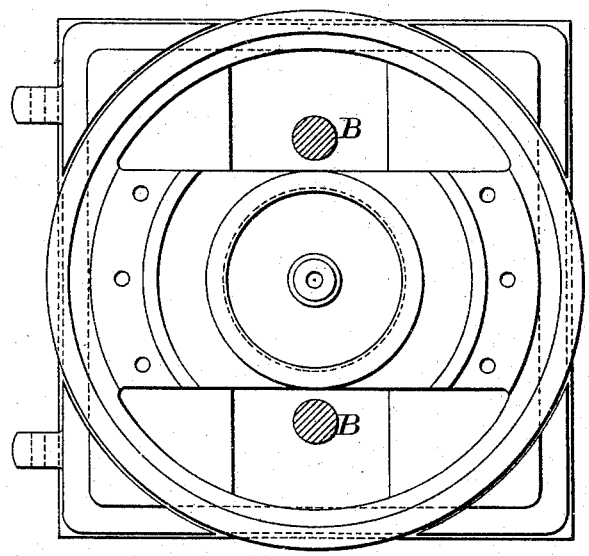

Having reference now to Figs. 20 to 28, which illustrate my improvements applied to a slide-valve governing double ports and showing the cover of the slide-case supported against excessive strain by means of bolts tying it to the body of the cylinder, Figs. 20 and 21 are longitudinal transverse sections of the slide-valves and their cases. Fig. 22 is a plan of the cylinder-facing, on which the slide-valve works, showing the ports leading to the ends of the cylinder. Fig. 23 is a plan of the upper face of the slide just below the cap C, which works against the under facing of the cover of the slide-case. Fig. 24 is a plan, looking from below, of the under face of the slide-valve. Fig. 25 is a plan, looking from below, of the rubbing faces formed on the under side of the cover of the slide-case. Fig. 26 is a plan of the cap which rubs against the lower face of the cover. Fig. 27 is a plan, and Fig. 28 a section, of the spring R, which forms a packing for the cap C.

As shown in Figs. 11, 12, and 13, the facing is formed on the surface of the cylinder itself, whereas in Figs. 1, 2, 3, 20, 21, and 22 it is a separate piece F, having flanges at the sides and ends, and in the middle secured to the body of the cylinder by studs and nuts $f$, which are under the level of the working face. By this mode of fixing the facing, the use of sunk-headed screws is avoided and the risk of irregular wear consequent on their use.

In the arrangement shown in Figs. 1 to 9 the interior lips of the faces of the slide-valve uncover alternately the ports $P^3$ $P^4$ for supply of steam to the two ends of the cylinder, the exterior lips uncovering these ports alternately for exhaust.

In the arrangement shown by Figs. 11 to 19 and 20 to 28 the slide-valve has, besides the middle port P, two end ports $P'$ $P^2$, and the passages $P^3$ $P^4$ to the ends of the cylinder are double-ported. S is the steam-supply, which in all the arrangements shown, opens by a middle port P to the interior of the slide-valve. Within the slide-valve in the B and C arrangements are formed exhaust-passages E E, having ports $e$ $e$ which communicate with the inner ports of the cylinder-passages $P^3$ $P^4$, the outer edges of the slide-valve uncovering the outer ports of these passages. The passages E E slope upward from the middle of the slide-valve and their mouths open outside the slide-valve into the slide-case, from any convenient part of which there is a passage for exhaust. The upper exterior edge of the slide-valve is surfaced flat to receive the spring-ring R, which, as shown in Figs. 1 and 2, is held down by four brackets (shown in section and plan at Fig. 10) screwed on the upper part of the slide-valve.

In Figs. 11 and 12 the ring R is shown to be held down by a dish H, which has passages through it and is pressed down by a volute spring $H'$, and, as shown in Figs. 20 and 21, the ring is held down by a couple of brackets screwed down on the top of the slide-valve. (See Fig. 27.) The ring R is slightly rounded at its outer edge, which fits within the cap C, so as to present a smaller area below than above, and thus insure its tight fitting on the upper edge of the slide-valve. The central part of the cap C, where it incloses a boss of the slide-valve, as shown in Figs. 11 and 12, or where it is inclosed in a boss of the slide-valve, as shown in Figs. 1, 2, 20, and 21, is slightly rounded, or is surrounded by a slightly-rounded face to allow for a slight rocking movement, which might arise from want of parallelism between the cylinder-face and the cover of the slide-case or from the lifting of the slide-valve more at one side than at the other. The ring R is divided across at one part of its circumference and a cover-piece $r$, fixed to one side, is let into a recess of the ring to prevent leakage out through the cut of the ring, which cut allows the ring to expand as the rubbing-surfaces of R and C become worn. The cap C is pressed upward against the cover $C'$ partly by the spring $H^2$, (shown in Figs. $1^A$, $2^A$, $1^C$, and $2^C$,) or the spring $H'$, (shown in Figs. 11 and 12,) and also by the fluid-pressure under it within the ring R. The cap C is made with an outwardly-projecting flange to enlarge the surface pressed upon by the fluid, and thus to reduce the pressure per unit of surface by which the cap C is urged up against the cover $C'$.

The upper face of the cap C has a circular groove $c$ sunk in it and lateral chases $c'$ from it outward to allow escape of such fluid as might leak in between the rubbing-faces. The inner edge of the groove $c$ being made a little less in diameter than the outer diameter of the ring R, there is always a little excess of pressure pressing the cap C against the cover independently of the spring $H'$ or $H^2$.

The cap C is free to rotate a little to and fro, and thus the wear of its surface and the face $C'$ of the cover on which it rubs is equalized. As shown in Figs. 6, 16, and 25, the facing projecting from the cover $C'$ is made of such a shape that it corresponds in width with the cap C, but that its length within and without is such that the cap C overpasses it in making its stroke with the slide-valve, so that no shoulder can be formed by wear.

As shown in Figs. 5, 15, and 24, the under face of the slide-valve is made with oblique chases allowing ingress of fluid, which serves to lubricate the working faces, and the cylinder-facing, as shown in Figs. 3, 15, and 22, is made of the same width from side to side as the slide-valve; but it is of such breadth in the direction of the stroke of the slide-valve that the slide-valve overpasses it at every stroke, overpassing, also, the edges of the ports, and thus preventing formation of shoulders by wear.

When tie-bolts are used, as shown in Figs. 20 to 28, I prefer to widen them out at the parts B, so that their sides nearly touch the sides of the cross-bar of the cap C, and thus if the cap should be slightly displaced its cross-bar will have the flat side of the bolt to rub against.

Although I have shown in the drawings that the working fluid is admitted to the interior of the slide-valve from below or from that side where the port-facing is, obviously it might be admitted by a passage through the cover of the slide-case.

Having thus described the nature of my said invention and the best means I know for carrying the same into practical effect, what I claim is—

1. A slide-valve for a steam or other fluid-pressure engine, having an internal cavity arranged to be supplied with working fluid through a port in the cylinder-facing, a central port having the inner edges of its face arranged to uncover for supply and to cover for cut-off, and ports leading to the ends of the cylinder and having the outer edges of their faces arranged to cover the said ports and to uncover them for discharge of exhaust into the case outside of the slide-valve, substantially as described.

2. A slide-valve for a steam or other fluid-pressure engine, having an internal cavity supplied with working fluid through a port in the cylinder-facing, having a middle port and two end ports governing double ports to each end of the cylinder, and having within its cavity eduction-passages with ports, said passages opening into the slide-case, substantially as described.

3. In combination with a slide-valve having an internal cavity supplied with working fluid through a port in the cylinder-facing, and a circular cap pressed against the cover of the slide-valve case and packed by a spring-ring carried on the upper edge of the slide-valve, substantially as and for the purpose described.

4. A slide-valve having an internal cavity supplied with working fluid through a port in the cylinder-facing and having a circular cap pressed against the cover of the slide-case and in which the forms and dimensions of the rubbing-surfaces are so arranged that the pressures toward the cylinder and toward the cover nearly balance each other and that the stationary surfaces are overpassed by the reciprocating surfaces, substantially as and for the purposes described.

In testimony whereof I have signed my name to this specification, in the presence of two subscribing witnesses, this 20th day of April, A. D. 1891.

W. C. CHURCH.

Witnesses:
OLIVER IMRAY,
*Patent Agent, 28 Southampton Buildings, London, W. C.*
JNO. P. M. MILLARD,
*Clerk to Messrs. Abel & Imray, Consulting Engineers and Patent Agents, 28 Southampton Buildings, London, W. C.*